Patented June 16, 1942

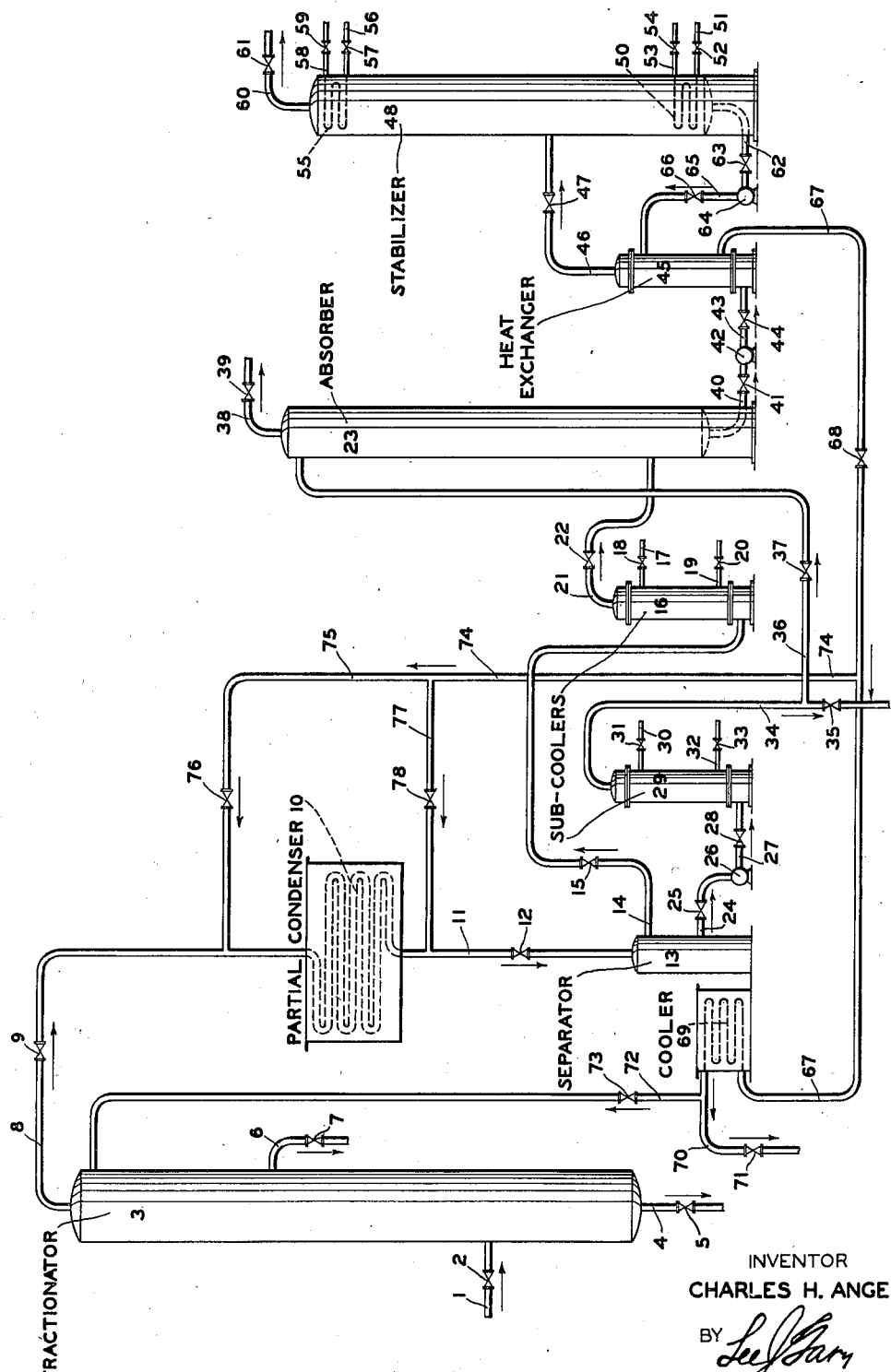

2,286,453

UNITED STATES PATENT OFFICE 2,286,453

TREATMENT OF HYDROCARBONS

Charles H. Angell, Chicago, Ill., assignor to Universal Oil Products Company, Chicago, Ill., a corporation of Delaware Application September 30, 1938, Serial No. 232,565

2 Claims. (Cl. 196—8)

This invention particularly refers to an improved process involving a novel combination of fractionation, condensation, absorption and stabilization steps by means of which normally gaseous products and vapors of the desired end-boiling point are separated from a mixture of higher boiling vaporous products resulting from the pyrolytic conversion of hydrocarbon oils, and fractionated vapors and gases further separated into distillate of the desired vapor pressure and boiling range characteristics, relatively light gases and an intermediate fraction consisting of normally gaseous products and containing a higher percentage of readily polymerizable olefins, such as propene and/or butenes, than can be recovered from equipment of the same type operated in a conventional manner.

Relatively heavy components, such as propene and butenes, contained in the normally gaseous products resulting from the pyrolysis of hydrocarbon oils have recently become of increased value due to the development of a now well known catalytic polymerization process wherein such materials, or a mixture of gases containing a relatively high percentage of propene and/or butenes, may be converted to produce substantial yields of polymerized gasoline having unusually high antiknock and blending value. With their increased value, the problem of separating these readily polymerizable olefinic gases from the greater quantity of other gases produced in the cracking operation, which are of little or no value as polymerization stock, has acquired considerable importance. The problem is to segregate substantially all of the desired high-boiling olefinic gases from the lower boiling gaseous products of the cracking operation, which are relatively inert to polymerization, at a minimum cost both with respect to the recovery equipment required and the cost of its operation.

The conventional method of recovering such yields of the desired olefinic gases as are consistent with the expense involved in their recovery has been to fractionate the total vaporous conversion products of the cracking operation, to condense their components boiling above the range of gasoline, remove fractionated vapors and gases of the desired end-boiling point as a vaporous stream from the fractionating zone, condense substantially all of the normally liquid components of said vaporous stream, separate the resulting distillate from the uncondensed and undissolved gases, stabilize the distillate, which contains a substantial portion of the desired readily polymerizable normally gaseous olefins, to reduce its vapor pressure to the desired degree by liberating therefrom regulated quantities of the dissolved gases, subject the gases liberated from the distillate by said stabilization and the uncondensed and undissolved gases previously separated from the unstabilized distillate to absorption by intimately contacting the same with an absorber oil capable of selectively absorbing the desired high-boiling gases, and finally separating the latter from the resulting enriched absorber oil by distillation or stripping. In some cases the absorption step and the subsequent distillation or stripping of the enriched absorber oil is omitted, in which case, the gases liberated from the distillate in said stabilization step comprise the polymerization stock. However, in the latter case, an appreciable quantity of the desired readily polymerizable olefins remain in the gases separated from the unstabilized distillate following condensation of the fractionated vapors and are not recovered therefrom for use as polymerization stock.

In the present invention, yields of the desired readily polymerizable olefinic gases comparable with or higher than those obtainable by the conventional method of operation, first above described, are obtained by a novel and advantageous combination of fractionation, condensation, absorption and stabilization steps involving the same or less costly equipment than that required for the comparable conventional method, with the exception that the distillation step for recovering the desired gases from the enriched absorber oil is obviated and the expense of this equipment and its operation thereby eliminated.

As compared with the last described conventional method of recovering desired readily polymerizable olefins, the process of the invention effects a more complete separation of the desired heavy and undesired lower boiling gases and produces a polymerization stock which contains a higher concentration of the desired readily polymerizable olefinic gases and also contains a higher percentage of the total readily polymerizable gases produced in the cracking operation.

One specific embodiment of the process of the invention comprises fractionating a mixture of hot vaporous and gaseous products resulting from the pyrolytic conversion of hydrocarbon oils to condense their components boiling above the range of the desired final distillate, removing the remaining uncondensed vapors and the normally gaseous products from the fractionating zone, partially condensing the same to form a substantially gas-free distillate, separating the latter from the remaining uncondensed vapors and gases, further cooling said uncondensed vapors and gases and supplying the same to an absorber, separately further cooling said substantially gas-free distillate and thence supplying the same in regulated quantities to the absorber, wherein it intimately contacts said gaseous products and selectively absorbs substantially all of their desirable high-boiling components, removing the resulting enriched absorber oil and distillate resulting from said further cooling of the uncondensed vapors and gases from the absorber in commingled state, stabilizing the commingled materials to reduce their vapor pressure to the desired degree by liberating therefrom regulated quantities of the dissolved normally gaseous products, recovering the liberated gases which contain a high percentage of readily polymerizable components and comprise substantially all of the butenes and at least a substantial quantity of the propene contained in said vaporous stream removed from the fractionator, separately recovering regulated quantities of the resulting stabilized distillate and cooling and returning another regulated quantity thereof to the fractionating step wherein it serves as a cooling and refluxing medium and wherein it is revaporized, a major portion thereof being subsequently condensed and collected as a portion of said substantially gas-free distillate, whereby to increase the quantity of absorber oil available for said selective absorption of the desired high-boiling gases.

The accompanying diagrammatic drawing illustrates one specific form of apparatus embodying the features of the invention and in which the process of the invention may be conducted.

Referring to the drawing, hot vaporous conversion products, such as those resulting from the pyrolytic conversion or reforming of hydrocarbon oils, are supplied from cracking equipment, not illustrated, through line 1 and valve 2 to fractionator 3 wherein their components which boil above the range of the desired final distillate product of the process are condensed as reflux condensate. The total reflux condensate formed in fractionator 3 may be removed from the lower portion thereof through line 4 and valve 5 to further cracking within the same system wherefrom said vaporous products are derived or in a separate cracking system or this material may be directed to cooling and storage or to any other desired further treatment. The invention also contemplates separation of the reflux condensate formed in fractionator 3 into any desired number of selected fractions of different boiling characteristics by fractional condensation in this zone. As an illustration, line 6 and valve 7 are provided through which a selected low-boiling fraction of the reflux condensate may be removed from a suitable intermediate point in the fractionator and directed to further cracking or to cooling and storage or to any desired further treatment, not illustrated.

Fractionated vapors of the desired end-boiling point, which in most instances consist of materials boiling within the range of gasoline and normally gaseous conversion products, are directed from the upper portion of fractionator 3 through line 8 and valve 9 to partial condenser 10 wherein they are cooled sufficiently to condense their high-boiling components and thus form a substantially gas-free condensate. The latter is directed, together with the uncondensed vapors and gases, through line 11 and valve 12 to collection and separation in separator 13.

The uncondensed vapors and gases are directed from the upper portion of separator 13 through line 14 and valve 15 to further cooling and condensation in sub-cooler 16, wherein they pass in indirect heat exchange with a suitable cooling medium which is passed therethrough by means of lines 17 and 19 containing respective valves 18 and 20. Substantially all of the normally liquid components of the uncondensed vapors and gases supplied to sub-cooler 16 are condensed in this zone and directed therefrom, together with the remaining uncondensed gases, through line 21 and valve 22 to absorber 23.

The substantially gas-free distillate collected in separator 13 is directed therefrom through line 24 and valve 25 to pump 26 wherefrom it is directed through line 27 and valve 28 to sub-cooler 29, wherethrough it passes in indirect heat exchange with a suitable cooling medium directed to this zone through line 30 and valve 31 and removed therefrom through line 32 and valve 33. The resulting sub-cooled, substantially gas free distillate is directed from sub-cooler 29 through line 34 and, when desired, may be removed in part from the system to storage or to any desired further treatment through valve 35 in line 34. However, in accordance with the provisions of the invention, at least a regulated portion of the sub-cooled, substantially gas free distillate is utilized as absorber oil for recovering desirable high-boiling components from the normally gaseous products of the process. This is accomplished by supplying the same from line 34 through line 36 and valve 37 to the upper portion of absorber 23 wherethrough it passes downwardly in direct countercurrent contact with the uncondensed gases supplied to this zone from sub-cooler 16.

Absorber 23 may comprise any conventional form of absorption equipment wherein the substantially gas-free distillate intimately contacts the uncondensed gases and serves as a selective absorber for the desired high-boiling components of said gases. The unabsorbed relatively light gases are released from the upper portion of absorber 23 through line 38 and valve 39 to storage or elsewhere, as desired. The absorber oil supplied to absorber 23 and enriched thereby by absorption of the desired high-boiling gases, commingles in the lower portion of this zone with the condensate supplied thereto from sub-cooler 16 and the commingled materials which constitute the unstabilized light distillate product of the process are directed from the lower portion of absorber 23 through line 40 and valve 41 to pump 42 wherefrom they are directed through line 43 and valve 44 to heat exchanger 45 and thence through line 46 and valve 47 into stabilizer 48. The distillate passing through heat exchanger 45 is heated therein sufficiently to effect its substantial vaporization and, in the particular case illustrated, this is accomplished by passing the unstabilized distillate in indirect heat exchange with the relatively hot stabilized distillate, as will be later described. However, any desired method and means of heating the unstabilized distillate to the required temperature, either within or prior to its introduction into stabilizer 48, may be employed within the scope of the invention.

Preferably, in order to obtain the desired rectification of the distillate in stabilizer 48, reboiling means are provided in the lower portion of the stabilizer and cooling means are provided in the upper portion of the stabilizer. In the case here illustrated, reboiling is accomplished by passing a suitable heating medium through closed coil 50 provided in the lower portion of the stabilizer by means of lines 51 and 53 containing the respective valves 52 and 54. Any other well known means of reboiling may be provided either in the lower portion of stabilizer 48 or in a separate reboiling zone to which bottoms from the stabilizer are supplied and wherefrom evolved vapors and gases are returned to the stabilizer. In the case here illustrated, the desired degree of cooling in the upper portion of the stabilizer is accomplished by passing a suitable cooling medium through closed coil 55 in this zone by means of lines 56 and 58 containing the respective valves 57 and 59, whereby a portion of the materials undergoing treatment in the upper portion of the stabilizer are condensed to form a refluxing medium. The direct introduction of a suitable refluxing and cooling medium into the upper portion of the stabilizer is, of course, also within the scope of the invention, although not here illustrated.

The gases liberated from the distillate in stabilizer 48 will contain that portion of the desired high-boiling gases dissolved in the bottoms from absorber 23 which are supplied to the stabilizer in excess of those required to produce a stabilized distillate of the desired vapor pressure. Since a major portion of the lower boiling gases have been previously separated from the desired high-boiling gases in absorber 23, the gases liberated from the distillate in the stabilizer will contain a high percentage of the desired heavy fractions and will include at least a major portion of these desired heavy fractions contained in the overhead vaporous stream from fractionator 3. This desired normally gaseous product is removed from the upper portion of stabilizer 48 and may be directed through line 60 and valve 61 to storage, or direct to a polymerization process or all or a portion of this material may be first condensed by well known means, not illustrated, and regulated quantities of the condensate returned to the upper portion of the stabilizer as a cooling and refluxing medium.

The reboiled and stabilized distillate is removed from the lower portion of stabilizer 48 and, in the particular case here illustrated, is directed through line 62 and valve 63 to pump 64 wherefrom it is fed through line 65, valve 66 and heat exchanger 45, passing in indirect heat exchange in the latter zone with the unstabilized distillate being supplied to stabilizer 48 and serving to reheat and partially vaporize the latter. The resulting partially cooled, stabilized distillate is directed from heat exchanger 45 through line 67 and valve 68 to further cooling in cooler 69, wherefrom regulated quantities of the stabilized distillate are directed through line 70 and valve 71 to storage or to any desired further treatment. Regulated quantities of the cooled, stabilized distillate is directed from cooler 69 through line 72 and valve 73 into the upper portion of fractionator 3 wherein it serves as a cooling and refluxing medium for the vaporous and gaseous products undergoing fractionation in this zone and wherein it is at least substantially revaporized, passing with the fractionated vapors to partial condenser 10 wherein it is partially condensed, a major portion of the recycled distillate thus becoming a part of the substantially gas-free distillate collected in separator 13, whereby it is made available as an additional quantity of absorber oil for use in the manner previously described.

Ordinarily, the quantity of absorber oil required to produce the required results in absorber 23 will be greater than the net make of substantially gas-free distillate collected in receiver 13 and recirculation of the stabilized distillate to the fractionator serves the two-fold purpose of utilizing this material as a refluxing and cooling medium in the fractionator and of providing additional quantities of absorber oil. In many cases, however, the additional quantity of absorber oil required will be greater than the quantity of cooling and refluxing medium required in the upper portion of fractionator 3. The invention therefore provides for returning regulated quantities of the stabilized distillate to separator 13 without first returning the same to the fractionator. This is accomplished, in the case here illustrated, by commingling regulated quantities of the stabilized distillate with the stream of overhead vaporous products from fractionator 3 being supplied to condenser 10 and/or with the stream of condensate and uncondensed vapors and gases passing from condenser 10 to separator 13. Preferably, in order to avoid the inclusion of any substantial quantity of normally gaseous products in the distillate collected in separator 13 by returning stabilized distillate to this zone, the latter is not passed through cooler 69 but is diverted from line 67 ahead of cooler 69 through line 74 and supplied therefrom through line 75 and valve 76 into line 8 and/or through line 77 and valve 78 into line 11 or, when desired, relatively hot reboiled and stabilized distillate from stabilizer 48 may be supplied to line 9 and/or line 11 by well known means, not illustrated, without first passing through heat exchanger 45.

As an example of the specific operating conditions which may be employed to produce the desired results in an apparatus such as illustrated and above described: Vaporous products resulting from the pyrolytic conversion of hydrocarbon oils are supplied to the fractionator at a temperature of approximately 750° F. The fractionator is maintained at a superatmospheric pressure of approximately 75 pounds per square inch. The stream of fractionated vapors supplied from the fractionator to the succeeding partial condensation step has approximately the following analysis after corrections have been made by deducting therefrom the components which have been returned as stabilized distillate to the fractionator to serve as a cooling and refluxing medium.

| Fraction | Percent by weight of the fractionated vapors |
|---|---|
| $C_2H_4$ and lighter | 0.2 |
| $C_2H_6$ | 0.5 |
| $C_3H_6$ | 2.1 |
| $C_3H_8$ | 3.0 |
| i-$C_4H_8$ | 0.8 |
| n-$C_4H_8$ | 4.1 |
| $C_4H_{10}$ | 4.3 |
| $C_5H_{10}$ and $C_5H_{12}$ | 10.0 |
| $C_6$ and heavier | 75.0 |
| | 100.0 |

This material is subjected to condensation in the partial condenser wherein it is cooled to an outlet temperature at approximately 200° F. at a superatmospheric pressure of approximately 75 pounds per square inch and the resulting uncondensed vapors and gases and the distillate, which latter is substantially free of dissolved gases, are supplied to a separator.

The uncondensed vapors and gases from the separator are further cooled to a temperature of approximately 100° F. and resulting distillate and remaining uncondensed and undissolved gases are introduced into the absorber which is maintained at a superatmospheric pressure of approximately 400 pounds per square inch. Substantially gas-free distillate from the separator is further cooled to a temperature of approximately 70° F. and supplied to the upper portion of the absorber in sufficient quantities to maintain a temperature at this point of approximately 70° F. The bottoms from the absorber are reheated to a temperature of approximately 180° F. and introduced into the stabilizer which is maintained at a superatmospheric pressure of approximately 155 pounds per square inch. The top temperature of the stabilizer is maintained at approximately 155° F. and the bottom temperature of this zone is maintained at approximately 250° F. The stabilized distillate is passed in indirect heat exchange with the unstabilized distillate being supplied to this zone and is then returned, in part, to the partial condenser, while another portion of this product is further cooled to a temperature of approximately 90° F. and returned to the upper portion of the fractionator. The remainder of the stabilized distillate is recovered from the system and comprises cracked gasoline of approximately 400° F. end-boiling point having a vapor pressure (Reid) of approximately 10 pounds per square inch at 100° F. The unabsorbed low-boiling gases recovered as the overhead product from the absorption step are equivalent in weight to approximately 1.9% of the distillate recovered from the system and have the following approximate analysis:

| Fraction | Percent by weight |
|---|---|
| $C_2$ and lighter | 29.8 |
| $C_3$ | 57.2 |
| $C_4$ | 13.0 |
| | 100.0 |

The normally gaseous product recovered from the stablizer is equivalent to approximately 7.9% by weight of the stabilized distillate recovered from the system and has the following approximate analysis:

| Fraction | Percent by weight |
|---|---|
| $C_2$ and lighter | 1.6 |
| $C_3$ | 40.0 |
| $C_4$ | 50.4 |
| $C_5$ and heavier | 8.0 |
| | 100.0 |

It will, of course, be understood that the invention is not limited to the specific operating conditions given in the foregoing example, since they may be varied to suit requirements and will depend upon the analysis of the vapor-gas mixture supplied to the fractionator and the desired results with respect to the vapor pressure of the stabilized distillate and the composition of the intermediate product, (i. e., polymerization stock). For example, by employing a larger quantity of absorber oil than that used in the above described operation and/or employing a higher pressure or lower temperature, or both, in the absorber, a greater amount of $C_3$ and $C_4$ fractions will be absorbed and included in the enriched absorber oil supplied to the stabilizer. This will result in the inclusion of a greater proportion of $C_3$ fractions in the normally gaseous products recovered from the stabilizer and will also somewhat increase the quantity of lighter fractions contained in this product but will not necessarily increase its proportionate amount of such lighter fractions. Also, by stabilizing the gasoline product to a lower vapor pressure a greater amount and proportion of $C_4$ fractions will be included in the normally gaseous product recovered from the stabilizer.

I claim as my invention:

1. In the conversion of hydrocarbons wherein the vaporous conversion products are fractionated to condense and separate fractions thereof heavier than gasoline, leaving a mixture of gasoline vapors and gases, the method of recovering from said mixture a gasoline distillate and a normally gaseous fraction rich in polymerizable olefins, which comprises subjecting the mixture to partial condensation to condense only a portion of the gasoline vapors, thereby forming a substantially gas-free heavy gasoline condensate, introducing the remaining lighter gasoline vapors and gases to a scrubbing zone, separately introducing said condensate to the scrubbing zone and therein scrubbing the gases with the condensate, thereby absorbing $C_3$ and $C_4$ components of the gases in the condensate and combining the latter with the lighter gasoline fractions introduced to said zone, separately removing the unabsorbed gases and the enriched liquid from the scrubbing zone, stabilizing the liquid to liberate absorbed $C_3$ and $C_4$ gaseous components therefrom, and combining a portion of the stabilized gasoline liquid with said heavy gasoline condensate prior to the introduction of the latter to the scrubbing zone by introducing said portion of stabilized liquid into contact with said vaporous conversion products undergoing fractionation.

2. In the conversion of hydrocarbons wherein the vaporous conversion products are fractionated to condense and separate fractions thereof heavier than gasoline, leaving a mixture of gasoline vapors and gases, the method of recovering from said mixture a gasoline distillate and a normally gaseous fraction rich in polymerizable olefins, which comprises subjecting the mixture to partial condensation to condense only a portion of the gasoline vapors, thereby forming a substantially gas-free heavy gasoline condensate, separately subjecting the remaining light gasoline vapors and gases to condensation and introducing the uncondensed gases to a scrubbing zone, separately introducing said heavy condensate to the scrubbing zone and therein scrubbing the uncondensed gases with this condensate, thereby absorbing $C_3$ and $C_4$ components of the gases in the heavy gasoline condensate, separately removing the unabsorbed gases and the enriched liquid from the scrubbing zone, stabilizing the liquid to liberate absorbed $C_3$ and $C_4$ gaseous components therefrom, and combining a portion of stabilized liquid with said heavy gasoline condensate prior to the introduction of the latter to the scrubbing zone by introducing said portion of stabilized liquid into contact with said vaporous conversion products undergoing fractionation.

CHARLES H. ANGELL.